United States Statutory Invention Registration [19]

[11] Reg. Number: H885

Nagashima [43] Published: Feb. 5, 1991

[54] BEARING DEVICE FOR A CRANKSHAFT

[75] Inventor: Akira Nagashima, Kawasaki, Japan

[73] Assignee: Kioritz Corporation, Mitaka, Japan

[21] Appl. No.: 797,199

[22] Filed: Nov. 14, 1985

Related U.S. Application Data

[63] Continuation of Ser. No. 634,631, Jul. 26, 1984, abandoned.

[30] Foreign Application Priority Data

Aug. 1, 1983 [JP] Japan ..... 58-140711

[51] Int. Cl.[5] ..... F16C 9/00; F16C 23/04

[52] U.S. Cl. ..... 384/457; 384/496; 384/511; 384/516

[58] Field of Search ..... 384/496, 457, 511, 510, 384/516

[56] References Cited

U.S. PATENT DOCUMENTS

| | | | |
|---|---|---|---|
| 1,023,017 | 4/1912 | Hess | 384/516 |
| 1,307,493 | 6/1919 | Hanson | 384/511 |
| 2,230,989 | 2/1941 | Barish . | |
| 3,501,207 | 3/1970 | Pritchard . | |
| 3,542,154 | 11/1970 | Morner | 184/15.1 |
| 3,809,185 | 5/1974 | Kobayashi et al. | 184/6.5 |
| 4,089,570 | 5/1978 | Markfelder et al. . | |
| 4,382,333 | 5/1983 | Nagashima et al. | 30/381 |

FOREIGN PATENT DOCUMENTS

| | | | |
|---|---|---|---|
| 54-163404 | 11/1979 | Japan . | |
| 57-14932 | 9/1982 | Japan . | |
| 377713 | 7/1975 | Sweden . | |
| 538165 | 1/1977 | U.S.S.R. | 384/496 |

*Primary Examiner*—Thomas H. Tarcza
*Assistant Examiner*—Linda J. Wallace
*Attorney, Agent, or Firm*—Browdy and Neimark

[57] ABSTRACT

Disclosed is a bearing device for crankshaft wherein the cross sectional configuration of a ball-rolling groove of the inner race is so formed as to permit the ball-rolling groove to have a radius of curvature greater than the radius of the rolling ball, thereby to provide a clearance between the rolling ball and the ball-rolling groove permitting the rolling ball to be moved from one side to the other side of a central vertical line of the ball received by the outer race.

4 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BEARING DEVICE FOR A CRANKSHAFT

This application is a continuation of application Ser. No. 634,631, filed July 26, 1984, now abandoned.

BACKGROUND OF THE INVENTION

The present invention relates to a bearing device for a crankshaft, used in a crankcase dividable into two parts to the axial direction of a crankshaft.

A crankshaft bearing device, which has hitherto been used, is an ordinary ball bearing wherein inner and outer races and balls are assembled integrally with each other. In this ball bearing device, the ball bearing is forcibly inserted into a bearing section of the crankcase involved and fixed therein and, thereafter, a crankshaft is forcibly fitted into the inner race of the ball bearing thus incorporated.

When assembling, therefore, an excessively great stress is induced in the crankshaft to cause a deformation of the same. As a result, the rotation of the crankshaft becomes defective. At the time of disassembling as well, similar problems arise and these problems were causes of making it difficult to perform the assembling and disassembling operations.

SUMMARY OF THE INVENTION

The present invention has been accomplished in view of the above-mentioned circumstances and is intended to solve the problems which arise where the above-mentioned ball bearing device is used as a crankshaft bearing device and thus the object of the present invention is to provide a bearing device for crankshaft which is characterized in that the crankcase is dividable into two parts to the axial direction of the crankshaft; and the outer and inner races are separated from each other, whereby the outer race is fitted to the crankcase and the inner race is fitted onto the crankshaft and which makes the assembling of the crankshaft easy and which is arranged so that, at the time of assembling, it may prevent the occurrence of an excessively great stress causing the crankshaft to be deformed.

That is to say, the present invention is constructed such that it comprises an outer race fitted to the bearing section of a crankcase dividable into two parts to the axial direction of a crankshaft and having the rolling balls held by means of a retainer, and an inner race forcibly fitted onto the crankshaft independently from the outer race, and is characterized in that the cross sectional configuration of the ball-rolling groove of the inner race is formed so as to permit the ball-rolling groove to have a radius of curvature greater than the radius of the rolling ball, thereby to provide a clearance between the ball and the groove permitting the rolling ball to be moved from one side to the other side of a central vertical line of the ball received by the outer race.

According to the present invention, therefore, the outer race retaining the rolling balls is fitted to the bearing section of the crankcase dividable into two parts and, on the other hand, the inner race is fitted onto the crankshaft, both side inner and outer races being incorporated as such in the form of separate or independent elements. Namely, at the time of assembling the bearing device, a press work which is required to be performed in the prior art becomes unnecessary and the assembling operation can be completed simply by separately incorporating beforehand the inner and outer races constituting separate parts or elements and without occurrence of an unnecessary or excessively great stress to the crankshaft or other associated parts or elements.

Further, according to the present invention, not only the assembling of the crankshaft but also the disassembling, repairing, inspection, replacement of parts or elements, etc. can be simply and reliably performed. Namely, no special tool or technique is required for use in the assembling or disassembling operation and anybody can assemble or disassemble anywhere he likes.

BRIEF DESCRIPTION OF THE DRAWINGS

The drawings shown an embodiment of the present invention

DETAILED DESCRIPTION OF THE PREFERRED EMBODIMENT

Figure 1:
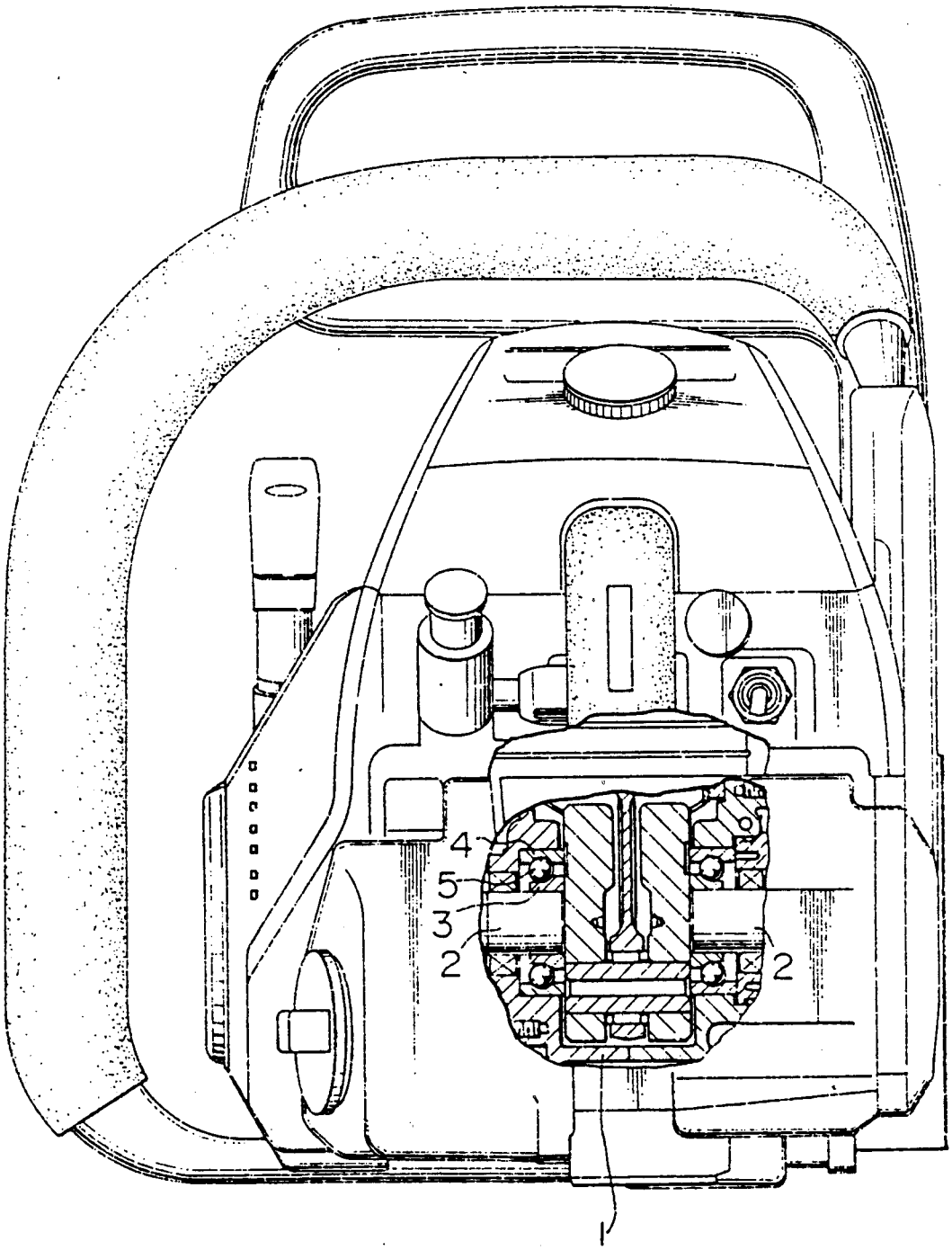
FIG. 1 is a rear view, partly in section, of a main part of a portable chain saw.

The construction of the present invention will now be described in connection with an embodiment thereof illustrated in the drawings.

FIG. 1 shows a portable chain saw and more specifically shows a main part, partly in section, of the portable chain saw so as to permit a bearing device for a crankshaft to be seen in the main part.

The crankcase 1 shown in FIG. 1 is a type which is dividable into two parts rightwards and leftwards along the axis of a crankshaft 2. An inner race 3 is forcibly fitted onto the crankshaft 2, while, on the other hand, an outer race 4 is fitted to, or mounted on, the crankcase 1. Although not shown, rolling balls 5 are retained on the outer race 4 by means of a retainer.

Figure 2:
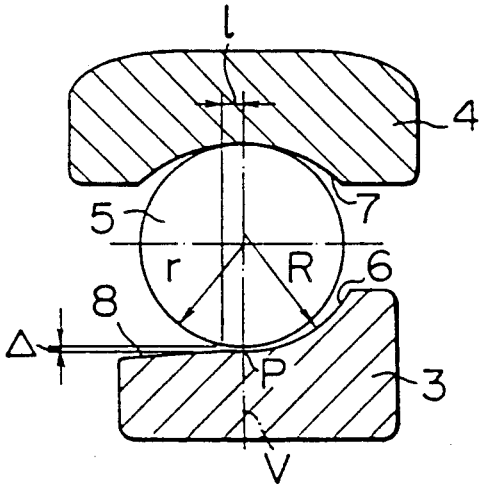
FIG. 2 is an enlarged sectional view of an inner race, a rolling ball, and an outer race of the bearing device shown in FIG. 1.
Figure 3:
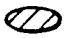
FIG. 3 is a view showing a state of contact of the rolling ball with the inner race, under load, at the point P indicated in FIG. 2.

FIG. 2 is an enlarged view showing the relationship between the inner race 3, the rolling ball 5 and the outer race 4. As shown in FIG. 3, the state of contact of the rolling ball 5 with a ball-rolling groove 6 of the inner race 3, under load, at the point P indicated in the figure 2, is the same as in the case of a commercially available ball bearing device used in the prior art.

The configuration of the outer race 4 and the ballrolling groove 7 thereof are the same as in the prior art and a description thereof is omitted. The cross sectional configuration of the ball-rolling groove 6 of the inner race 3 is shown in FIG. 2 and the ball-rolling groove 6 is formed to have a curved surface having a radius R of curvature greater than the radius of the rolling ball 5 to thereby provide a clearance between the ball 5 and the groove 6 permitting the rolling ball 5 to be moved from the right side to the left side of a central vertical line V of the ball 5 retainer by the outer race 4.

That is to say, the curved surface of the ballrolling groove 6 in conformity with the radius R of curvature thereof is extended by a distance l and with the clearance Δ to allow the ball 5 move to the left from the central vertical line V. Said curved surface has a downwardly inclined surface 8 as well over a range of from the said extended point further toward the left.

Therefore, before the device is assembled as shown in FIG. 1, the outer race 4 with the ball 5 is fitted to the bearing sections of the right and left crankcase parts and the inner race 3 is fitted onto the crankshaft 2 in a state wherein said downwardly inclined surface 8 is pointed outwards. At the time of assembling, the crankshaft 2 is inserted into the outer race 4 of the crankcase 1 with the center of the former in alignment with the center of the latter, then both the inner and outer races can be incorporated as shown in FIG. 1.

Accordingly, anybody can incorporate the crankshaft in a simple manner without occurrence of an excessively great stress therein which, at the time of incorporating, causes a deformation of the same. Nor is it necessary to use such a special tool as was required for incorporation in the prior art.

What is claimed is:

1. A bearing device for a crankshaft comprising an outer race having a ball rolling groove fitted to a bearing section of a crankcase dividable into two parts to the axial direction of a crankshaft and having rolling balls retained on the outer race, and an inner race having a ball rolling groove and forcibly fitted onto said crankshaft independently from said outer race, wherein the cross sectional configuration of said ball-rolling grooves of said outer and said inner races is formed so as to permit each said ball-rolling groove to have a radius of curvature greater than the radius of said rolling ball and said inner race having a downwardly inclined flat surface extending outwardly toward the outer end of said crankshaft from outward of a central vertical line of the ball-rolling groove of the inner race to the edge of the inner race, thereby to provide clearance between said rolling ball and said ball-rolling groove of the inner race permitting said rolling ball to be moved from one side to the other side of said central vertical line.

2. The bearing device of claim 1, wherein said ball rolling groove of said outer race is essentially symmetrically about said central vertical line.

3. The bearing device of claim 1, wherein said ball bearing, under load, contacts said outer and said inner races at points positioned essentially along said central vertical line.

4. The bearing device of claim 3, wherein said point of contact between said ball and said inner race defines an oval surface essentially centered about said vertical line.

* * * * *